United States Patent [19]

McLaughlin et al.

[11] Patent Number: 5,255,388
[45] Date of Patent: Oct. 19, 1993

[54] SYNCHRONIZING SLAVE PROCESSORS THROUGH EAVESDROP BY ONE ON A WRITE REQUEST MESSAGE DIRECTED TO ANOTHER FOLLOWED BY COMPARISON OF INDIVIDUAL STATUS REQUEST REPLIES

[75] Inventors: Paul F. McLaughlin, Hatfield; Pankaj H. Mody, Maple Glen; Robert W. Bristow, Hatboro, all of Pa.

[73] Assignee: Honeywell Inc., Minneapolis, Minn.

[21] Appl. No.: 588,389

[22] Filed: Sep. 26, 1990

[51] Int. Cl.$^5$ .............. G06F 15/04; G06F 15/40; G06F 11/16

[52] U.S. Cl. .............. 395/600; 364/DIG. 1; 364/268.9; 364/268.3; 364/268; 364/267.1; 364/266.4; 364/265.3; 364/265.1; 364/265.5; 364/264; 364/264.6; 364/264.4; 364/282.1; 364/285; 364/187; 395/575

[58] Field of Search .............. 395/575, 600; 364/187, 364/184, 405; 380/2; 371/9, 1

[56] References Cited

U.S. PATENT DOCUMENTS

| | | | |
|---|---|---|---|
| 4,133,027 | 1/1979 | Hogan | 364/187 |
| 4,141,066 | 2/1979 | Keiles | 364/186 |
| 4,183,086 | 1/1980 | Kober | 395/425 |
| 4,412,280 | 10/1983 | Murphy et al. | 395/575 |
| 4,412,281 | 10/1983 | Works | 364/200 |
| 4,466,098 | 8/1984 | Southard | 371/9 |
| 4,610,013 | 9/1986 | Long et al. | 371/9 |
| 4,700,292 | 10/1987 | Campanini | 395/200 |
| 4,799,150 | 1/1989 | Bui | 395/325 |
| 4,817,091 | 3/1989 | Katzman et al. | 371/9 |
| 4,873,631 | 9/1990 | Nathan et al. | 364/405 |
| 4,958,270 | 9/1990 | McLaughlin et al. | 364/187 |
| 4,959,774 | 9/1990 | Davis | 395/575 |
| 5,088,021 | 2/1991 | McLaughlin et al. | 364/187 |
| 5,091,847 | 2/1992 | Hebermann | 395/575 |
| 5,119,493 | 6/1992 | Janis et al. | 395/600 |
| 5,136,498 | 8/1992 | McLaughlin et al. | 364/184 |
| 5,142,470 | 8/1992 | Bristow et al. | 364/187 |

*Primary Examiner*—Thomas C. Lee
*Assistant Examiner*—Wayne Amsbury
*Attorney, Agent, or Firm*—A. A. Sapelli; W. Udseth; A. Medved

[57] ABSTRACT

Data bases of a first and second input output processor (IOP), which are primary and secondary slave IOPs, respectively, are synchronized, and communications by a master controller is made only to the first IOP. Each IOP is executing the same tasks utilizing their own clocking systems. A method for guaranteeing that the first and second data base remain synchronized comprises the steps of communicating a message to the first IOP to update the first data base. The second IOP eavesdrops on the communications, and when the second IOP recognizes that the message is to the corresponding primary slave IOP and that the first IOP has successfully received the message, accepts the message. The first IOP and the second IOP execute the received message. The master controller issues a status request type message to the first IOP, and then issues a status request type message to the second IOP. The controller verifies that responses to the status requests indicate the update of the respective first and second data bases was completed identically, thereby providing information which permits the master controller to guarantee the first and second data base remains synchronized after the update operation.

5 Claims, 9 Drawing Sheets

SYNCHRONIZING SLAVE PROCESSORS THROUGH EAVESDROP BY ONE ON A WRITE REQUEST MESSAGE DIRECTED TO ANOTHER FOLLOWED BY COMPARISON OF INDIVIDUAL STATUS REQUEST REPLIES

RELATED PATENT APPLICATIONS

The present application is related to U.S. patent application, Ser. No. 07/588,386, now U.S. Pat. No. 5,202,822, entitled "Universal Scheme of Input/Output Redundancy in a Process Control System" by Paul McLaughlin et. al., and U.S. patent application Ser. No. 07/588,388, now pending, filed on even date herewith, and assigned to Honeywell Inc., the assignee of the present application.

BACKGROUND OF THE INVENTION

The present invention relates to a method of data base maintenance, and more particularly, to a method for insuring that any data item stored in a primary slave processor commanded by a master controller is also stored in a secondary slave processor.

Process Control Systems with backup process controllers such as described and claimed in U.S. Pat. No. 4,133,027, issued to J. A. Hogan on Jan. 2, 1979, and U.S. Pat. No. 4,141,066, issued to Y. Keiles on Feb. 20, 1979, include a backup controller having a dedicated Random Access Memory (RAM) and a dedicated Read-Only Memory (ROM). The backup controller is essentially idle or can be doing some background tasks, but not tasks relating directly to the process control function. Upon detection of a failure of one of the primary process controllers, the data stored in the RAM of the failed controller must be transferred to the RAM of the backup controller to perform the operations of the primary controller. These systems describe a 1:N redundancy system.

Existing systems, such as that described in U.S. patent application, Ser. No. 07/299,859, filed on Jan. 23, 1989, now U.S. Pat. No. 4,958,270, and assigned to Honeywell Inc., the assignee of the present application, provide for a 1:1 redundancy system, whereby the data base of a secondary device (i.e., secondary or backup controller) is updated periodically such that the updating process is transparent to the primary functions and does not tie-up (or penalize) CPU or processor performance and utilizes a minimum amount of time. When a failover condition occurs, there is a period of time when no communications can take place (i.e., an outage) between the primary controller and the remainder of the system. Further, the primary and secondary controllers are in a predefined location, and the software utilized for implementing this redundancy feature (i.e., redundancy software) is not transparent to other layers of software above the redundancy software. For example, if a Universal Station of a plant control network were to interrogate a controller (i.e., a primary controller since the secondary controller cannot be interrogated), of a process controller of a process control system, for a value, during failover the controller is unable to respond and the universal station outputs question marks on the display to the operator.

The present invention provides a method which ensures that a data item written into a primary slave processor by a master controller is also received by a secondary slave processor and the data base of each slave processor (i.e., the primary and secondary) is updated identically. The method of the present invention does not require the primary and secondary slave processors to be running in a synchronous (i.e., lock-step) manner. Further, according to the method of the present invention, the data item to be stored is transmitted to the primary slave processor only. The present invention has the advantage over previous systems mentioned above in that there is no guaranteed store check in these earlier systems, and the guaranteed store is implied in the design rather than explicitly tested and verified. Also in the previous system mentioned above, the primary must send the data to the secondary. Where the primary and secondary do not communicate with one another, the previous method doesn't work. Further, the present invention does not require that the redundant processors perform their functions in an asynchronous manner with respect to time.

SUMMARY OF THE INVENTION

Thus there is provided by the present invention, a method for insuring that any data item stored in a primary slave processor commanded by a master controller is also stored in a secondary slave processor, the slave processor unable to communicate with one another and the slave processors running asynchronously.

In a process control system, having a master controller and at least one pair of slave input/output processors (IOPs), a first IOP of the pair is a primary slave IOP and a second IOP of the pair is a secondary slave IOP. The first and second IOP have a first and second data base, respectively, the first and second IOP each executing the same tasks utilizing a first and second clocking system, respectively, the data bases of the first and second IOPs are synchronized, communication by the master being made only to the first IOP including communications which modify the first data base. A method for guaranteeing that the first and second data base remain synchronized comprises the steps of communicating a message to the first IOP to update the first data base. The second IOP eavesdrops on the communications, and when the second IOP recognizes that the message is to the corresponding primary slave IOP, accepts the message. The first IOP and the second IOP execute the received message. The master controller issues a status request type message to the first IOP, and then issues a status request type message to the second IOP. The controller verifies that responses to the status requests indicate the update of the respective first and second data bases was completed without an error, thereby providing information which permits the master controller to guarantee the first and second data base remains synchronized after the update operation.

Accordingly, it is an object of the present invention to provide a method for insuring the data bases of a primary and secondary slave processors are updated identically as commanded by a master controller, wherein only the primary slave processor is commanded to be updated.

It is another object of the present invention to provide a method for insuring the data bases of a primary and secondary slave processors are updated identically, wherein only the primary slave processor is commanded to be updated, and wherein the primary and secondary slave processors cannot communicate with one another.

It is still another object of the present invention to provide a method for insuring the data bases of a primary and secondary slave processors are updated identically, wherein only the primary slave processor is commanded to be updated, and wherein the primary and secondary slave processors cannot communicate with one another, and the primary and secondary slave processors are running asynchronously.

These and other objects of the present invention will become more apparent when taken in conjunction with the following description and attached drawings, wherein like characters indicate like parts, and which drawings form a part of the present application.

DETAILED DESCRIPTION

Figure 1:
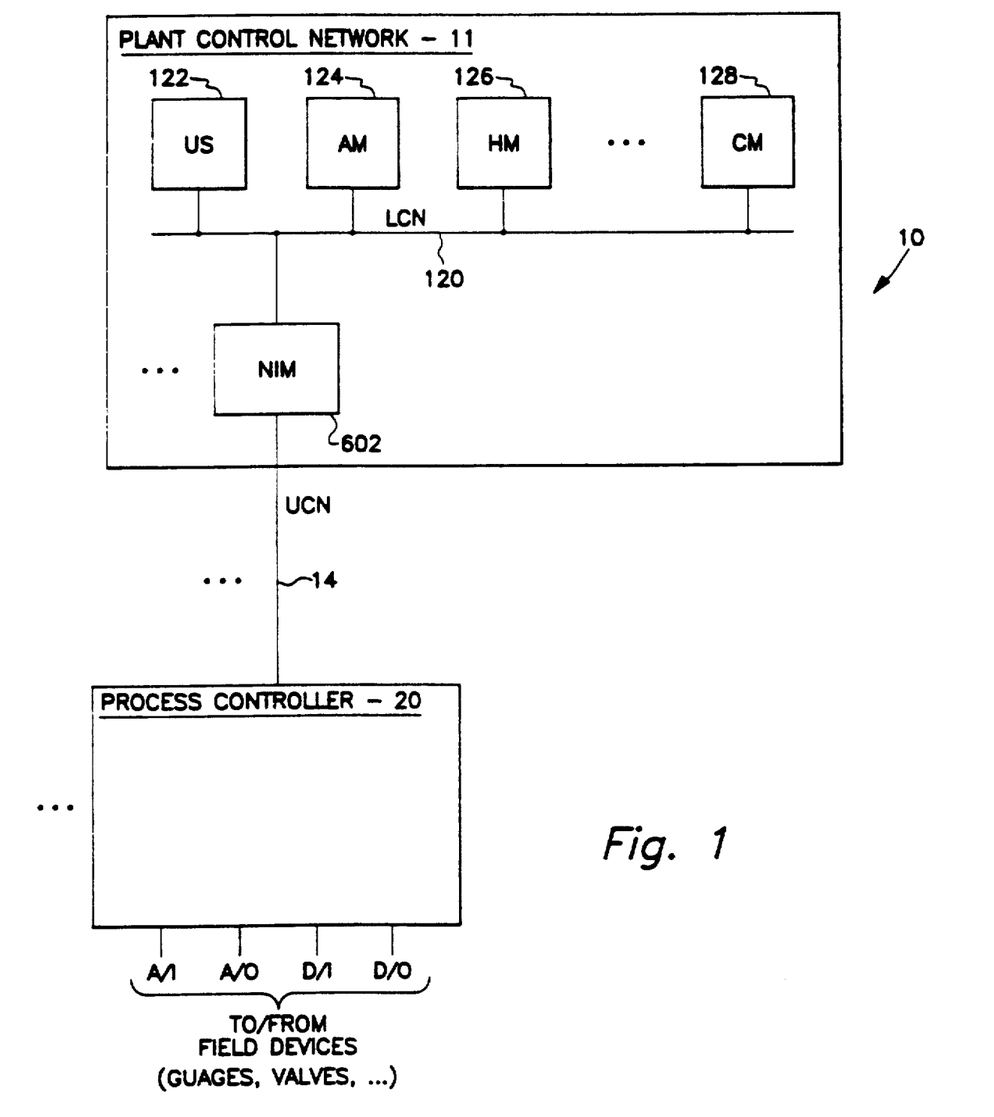
FIG. 1 shows a block diagram of a process control system in which the present invention can be utilized.

Before describing the method of the present invention, it will be helpful in understanding a system environment in which the present invention can be utilized. Referring to FIG. 1, there is shown a block diagram of a process control system 10 in which the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/-supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
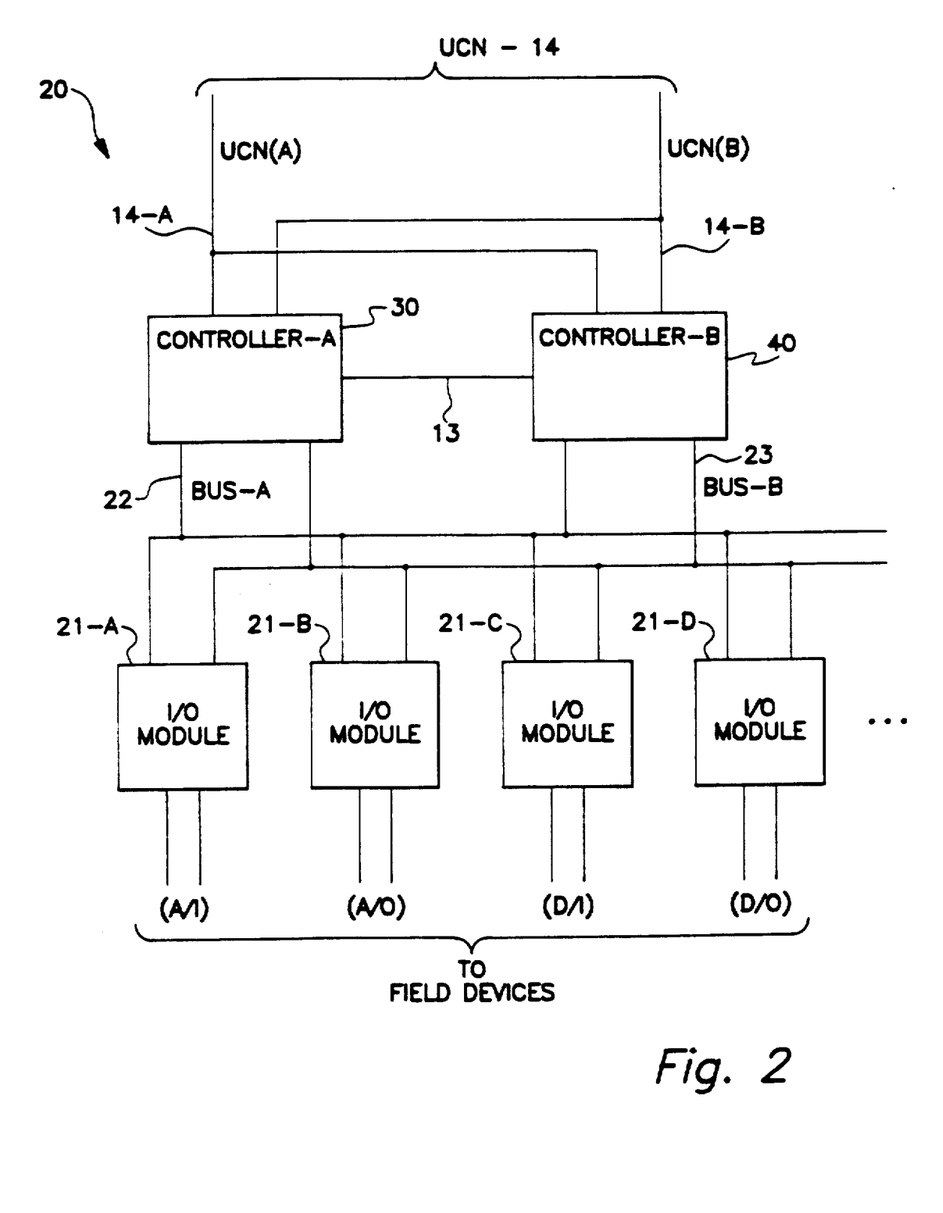
FIG. 2 shows a block diagram of a process controller, including I/O modules (IOP), in which the present invention can be utilized.

Referring to FIG. 2 there is shown a block diagram of the process controller 20. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various valves, pressure switches, pressure gauges, thermocouples,... which can be analog inputs (A/I), analog outputs (A/O), digital inputs (D/I), and digital outputs (D/O). The controller A 30 interfaces to each I/O module 21 via a bus A 22, and controller B 40 interfaces to each I/O module 21 via a bus B 23. In addition, once again for communication redundancy purposes, controller A 30 is also connected to bus B 23 and controller B 40 is connected to bus A 22.

Controller A and controller B, 30, 40, can communicate with each other via three mediums, the UCN 14, a link 13 between the controllers, and the buses A, B, 22, 23, with bus A and bus B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20.

Figure 3:
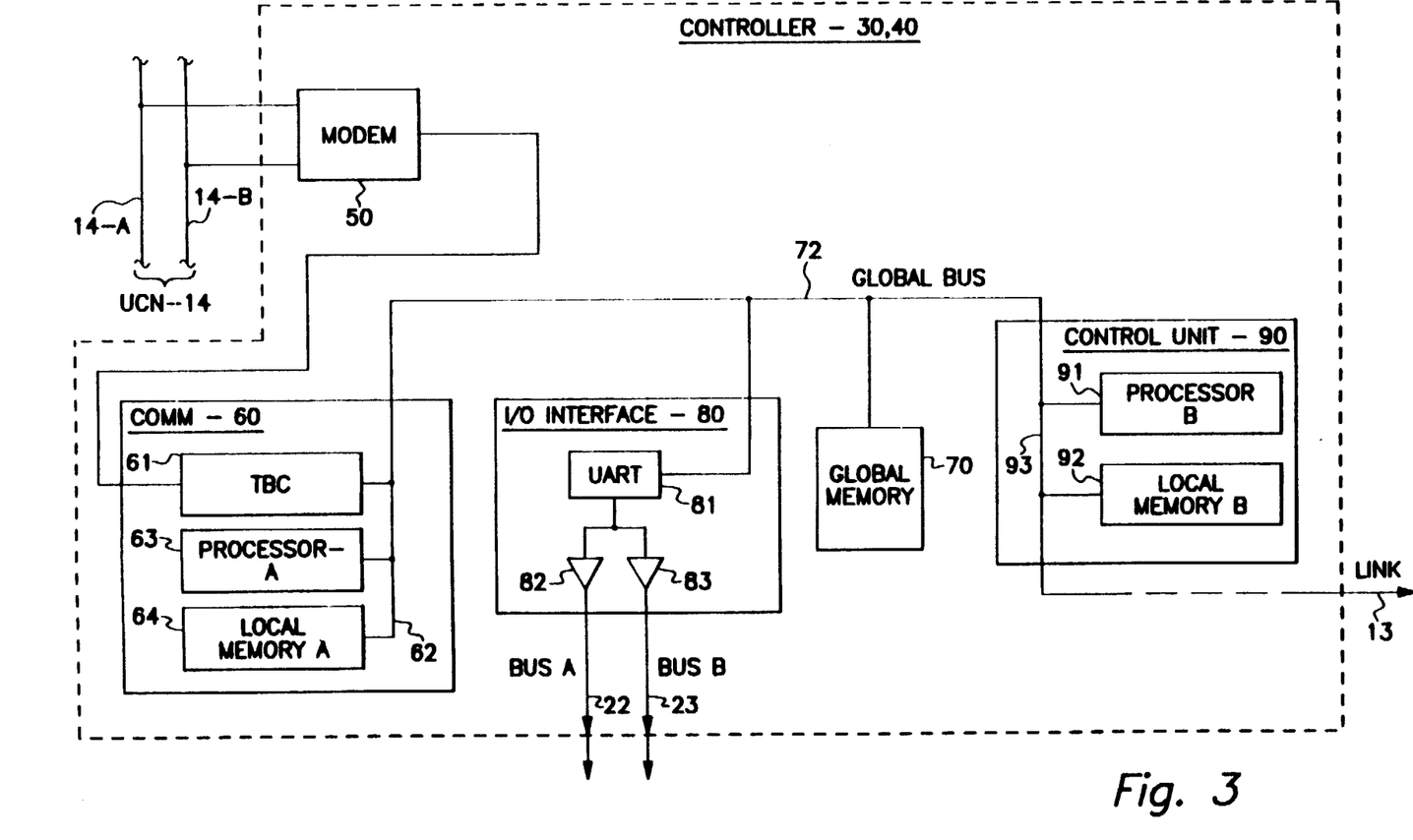
FIG. 3 shows a block diagram of a controller which is included in the process controller of FIG. 2.

Referring to FIG. 3, there is shown a block diagram of the controller 30, 40. A modem 50 is connected to the UCN 14, the modem having two inputs, one connected to UCN 14A and the other connected UCN 14B. The modem 50 interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. A processor A 63 (which essentially performs the communication function) is connected to the local bus 62, and a local memory A 64, which is also connected to the local bus 62. The processor A 63 communicates with the plant control network 11 via modem 50 and TBC 61. The local memory A 64 stores information, including personality image which is downloaded from the plant control network 11, for use by processor A 63 and TBC 61. The global memory 70 stores information which is common to both processor A 63 and a processor B 91. It also stores all the data received from bus A 22 and bus B 23. The global memory 70 also serves as an interprocessor communication vehicle between the processors A 63 and B 91. Control unit 90 includes the processor B 91 and a local memory B 92, both connected to a local bus 93. Processor B 91 performs the control function (i.e., control processing) relating to the field devices. This essentially includes performing the point processing, and updating the local memory B 92 and global memory 70. Also coupled to the local bus 93 of control unit 90 is a track unit (not shown) which is utilized to implement the data base transfer via link 13 to the other controller 30, 40 of the process controller 20. A more detailed description of the track unit can be had by making reference to patent applications:

(a) patent application Ser. No. 07/299,857, now U.S. Pat. No. 4,959,768, entitled "APPARATUS FOR TRACKING PREDETERMINED DATA FOR UPDATING A SECONDARY DATA BASE," by P. Gerhart, filed on Jan. 23, 1989; and (b) patent application Ser. No. 07/299,859, now U.S. Pat. No. 4,958,270, entitled "METHOD FOR CONTROL DATA BASE UPDATING OF A REDUNDANT PROCESSOR IN A PROCESS CONTROL SYSTEM," by P. McLaughlin et al, filed on Jan. 23, 1989;

both of the above-identified applications assigned to Honeywell Inc., the assignee of the present application. The I/O interface unit 80 includes a receiver-transmitter device, this device being a UART (Universal Asynchronous Receiver/Transmitter) 81. The UART 81 is coupled through drivers 82, 83 to bus A 22 and bus B 23, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Figure 4:
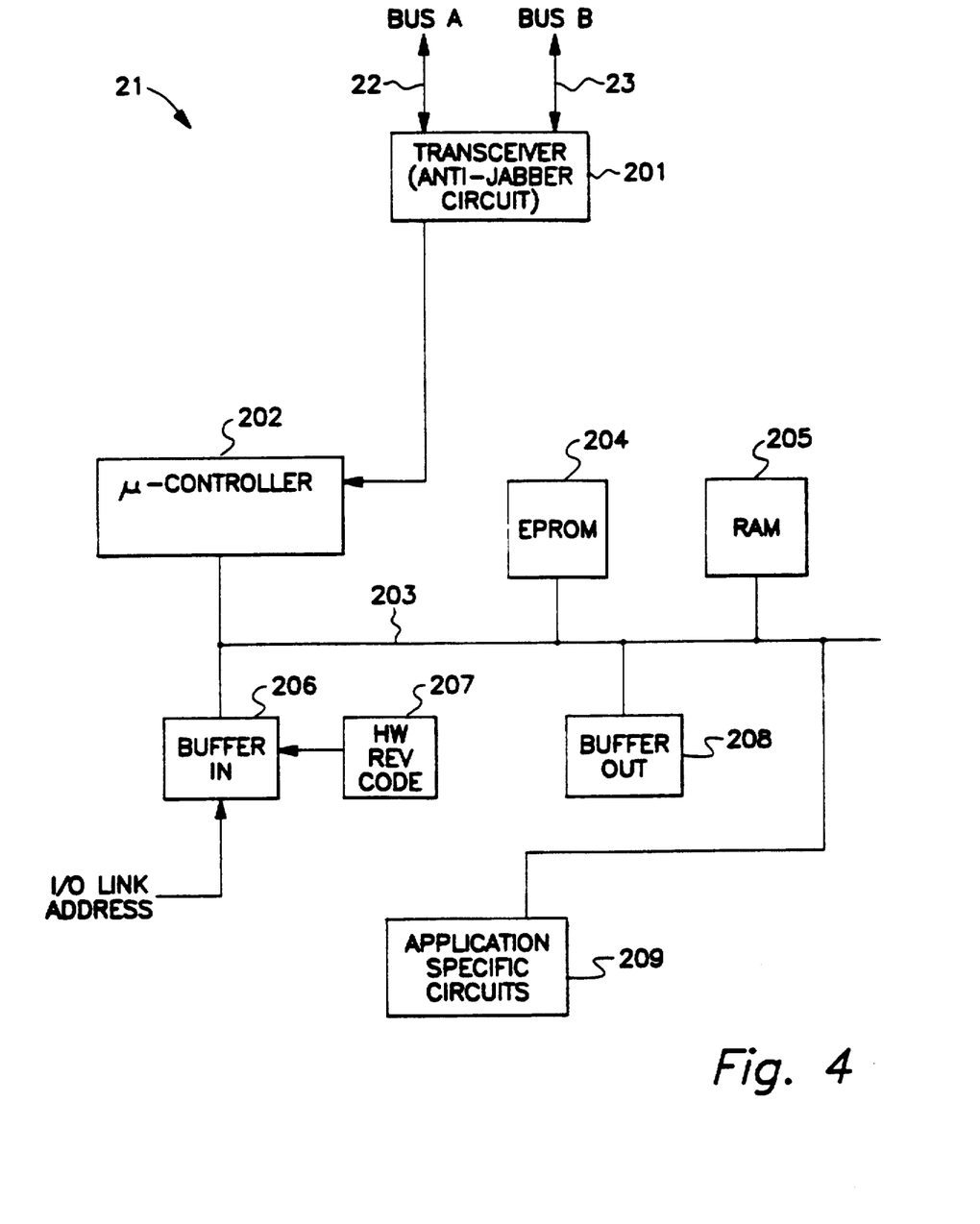
FIG. 4 shows a block diagram of an I/O module which is included in the process controller of FIG. 2.

Referring to FIG. 4 there is shown a block diagram of an I/O module. A transceiver (anti-jabber circuit) 201 interfaces with bus A 22 and bus B 23. The transceiver 201 interfaces with a microcontroller (u-controller) 202 which, in the preferred embodiment, is of the type, Intel 80C31. The microcontroller is coupled to a local bus 203, and includes an EPROM 204 and a RAM 205 also connected to the local bus 203. The RAM 205 contains the information which forms the database for the I/O module 21. The EPROM 204 contains the program information utilized by the microcontroller 202. Also attached to local bus 203 is an input buffer which receives the I/O link address information from the I/O link (bus A, bus B, 22, 23). The output buffer (BUFFER OUT) 208 is connected to the local bus 203. The application specific circuits 209 are also connected to the local bus 203 and interfaces with the input and output buffers 206, 208, and the microcontroller 202 via the local bus 203. The application specific circuits 209 vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, . . . ) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits). . . and generating a signal in a predetermined format having predetermined scale (i.e., engineering units, normalized units, percent of scale, . . .). In the preferred embodiment seven types of applications specific circuits are provided for, these include a high level analog input, low level analog input, analog output, digital input, digital output, smart transmitter interface, and pulse input counter.

Figure 5:
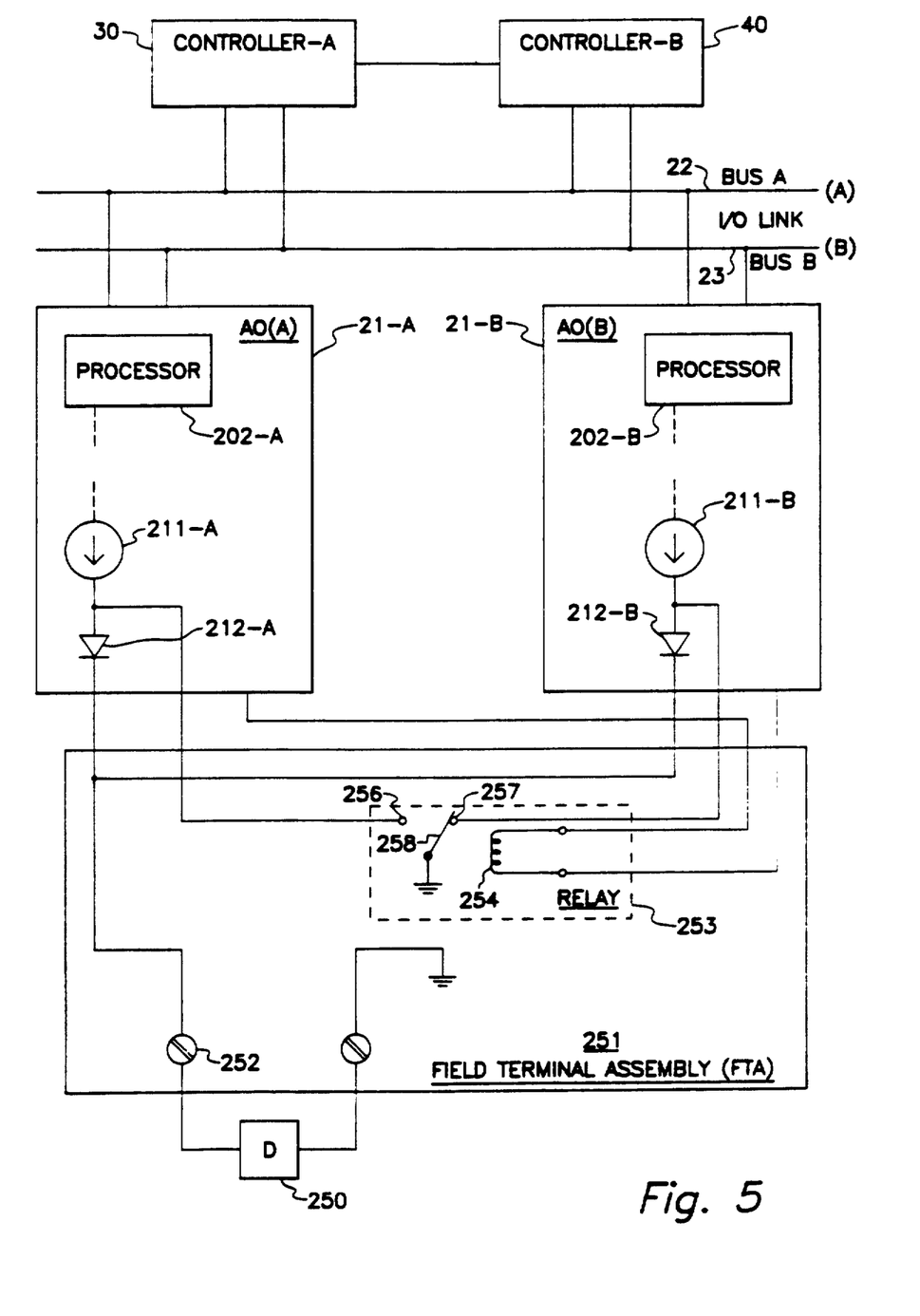
FIG. 5 shows a block diagram of the redundancy scheme of the I/O module within the process controller of FIG. 2.

Referring to FIG. 5, there is shown a functional block diagram of a field terminal assembly (FTA) 251 utilized to implement the redundancy scheme of the I/O modules 21 within the process controller 20. As described above, the process controller 20 includes controller A 30 and controller B 40 connected to the I/O link 22, 23. Also connected to the I/O link 22, 23 are the I/O modules 21 (also referred to herein as input/output processor IOP). In the redundancy scheme of the IOPs as utilized in the preferred embodiment of the process controller 20, the analog output type I/O module 21 is duplicated, shown in FIG. 5 as AO(A) 21-A and AO(B) 21-B. (Other I/O modules are connected to the I/O link 22, 23 as discussed above, but are not shown here for simplicity.) Each IOP includes a processor 202-A, 202-B, as described above. IOP AO(A) and IOP AO(B) are both connected to a field device (D) 250, through a field terminal assembly (FTA) 251, the field device being a valve, thermocouple, . . . . Both IOPs, AO(A) 21-A and AO(B) 21-B are performing the same tasks and outputting the same information (presuming no errors in either IOP) to the FTA 251. However, the output from only one IOP is actually coupled to the field device 250, as will now be discussed.

One IOP is designated the main or primary IOP and the other is designated the backup or redundant IOP. Here, IOP AO(A) 21-A is designated the main IOP interfacing with field device 250, and IOP AO(B) 21-B is designated the redundant IOP. Both IOPs are outputting the same information from a corresponding current source 211-A, 211-B. The output information is coupled to a common point 252 (a terminal sometimes referred to as the customer screw), through a corresponding diode 212-A, 212-B. A common point between the current source 211-A and diode 212-A of AO(A) 21-A is coupled to a first contact point 256 of a relay 253 and a common point between current source 211-B and diode 212-B of AO(B) 21-B is coupled to a second contact point 257 of relay 253. The arm 258 of relay 253 is connected to a ground point and is also normally switched (i.e. no current through the coil 254), to the second contact point of the relay 253, such that the output of the second current source 211-B of AO(B) 21-B is shorted to ground. In this manner only the output information from AO(A) 21-A is coupled to the field device 250. In the event of a failure of AO(A) 21-A, the relay 253 switches such that the output from AO(A) 21-A is shorted to ground and the output from the redundant IOP AO(B) 21-B is immediately coupled to the customer screw 252, and thus to the field device 250. The switching of relay 253 is initiated by activating a coil 254 of relay 253.

One terminal of relay coil 254 is connected to AO(A) 21-A and the other terminal of relay coil 254 is connected to AO(B) 21-B. Normally, the relay is switched (no current through coil 254) such that IOP(A) is communicating with the field device 250 and IOP(B) is in the backup mode (i.e., the IOP(B) output is shorted to ground by the relay 253.) When an error is detected by the controller 30, the controller A 30 (or controller B 40 if it is functioning as the primary controller) initiates a command to the IOPs to switch the relay 253. (The IOPs, IOP(A) and IOP(B) can also affect the switch over if they detect an error.)

Figure 6:
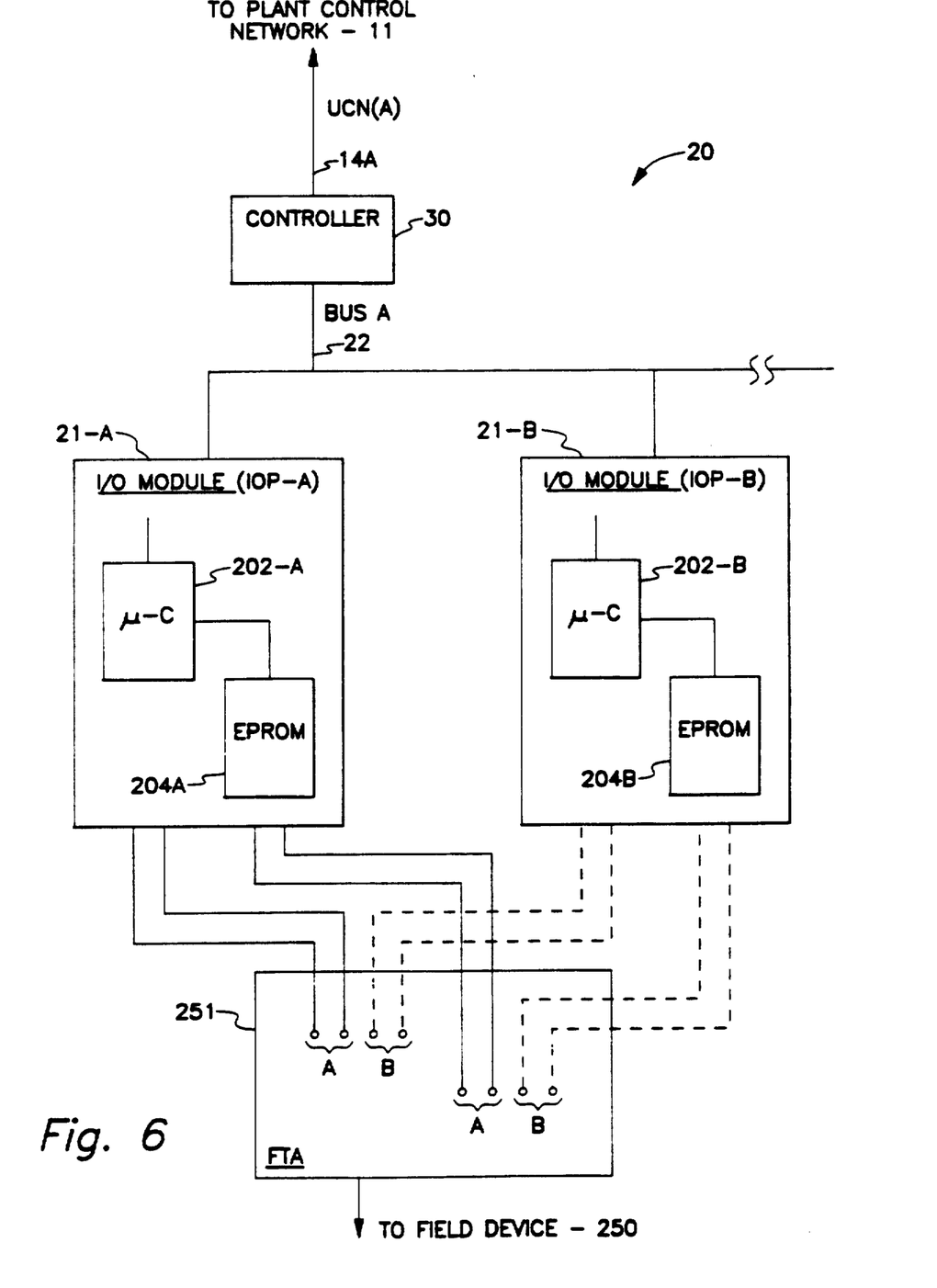
FIG. 6 shows a simplified block diagram of the process controller of FIG. 2.

The IOP redundancy will now be described. Referring to FIG. 6, there is shown a simplified block diagram of the process controller 20 of FIG. 2, having the redundancy of the controller omitted, and having an IOP and a backup IOP, only, for purposes of example. In the preferred embodiment, up to forty (40) IOPs can be included, and any mix of IOP types can be included in a redundant or non-redundant configuration. As will be recognized by those skilled in the art from the description above, the controller 30 performs as the master processor, the IOP module 21-A as the primary slave processor, and the IOP module 21-B as the backup (or secondary or redundant) slave processor.

For example purposes only, assume that the process controller 20 has controller 30 operating as the primary controller and I/O module 21-A (an analog output module) configured as module 1 in accordance with configuration rules of the process control system. IOP A 21-A is always present (assuming the requirement for an A/O IOP) and IOP B 21-B is optional (and initially assume it is not configured. Thus IOP B is shown in dotted lines in FIG. 6.) For example purposes, assume IOP(A) is placed in file address 3 and card address 8. (In the preferred embodiment of the system, the cabinet is divided in files (rows) and card slots.) Thus in this example the "printed circuit card" of an A/O IOP which is designated as IOP(A) 21-A is inserted in row 3, card slot 8. IOP(A) is given a logical address and assume that in this example is assigned logical address number 1. The controller 30 data base includes the data for an IOP connected to BUS-A 22 logical address 1, physical address of IOP(A) of file 3, card 8, and is initially non-redundant. (See State 1 of Table 1.) The controller 30 communicates to the primary slave IOP via the configured logical address. The process control system 10 is powered up and initialized along with the process controller 20, including controller 30 and IOP(A) 21-A, and running normally. IOP(A) 21-A is connected to the "A" points of FTA 251.

At some later time, the backup slave IOP 21-B can be added while the system 10 is running. IOP(A) 21-A continues to run normally and IOP(B) 21-B is configured in any spare location in the file (cabinet, row, . . . ). IOP(B) is connected to the "B" terminals of FTA 251, and in accordance with the configuration rules of the system, information is outputted (from the universal station US 122 of the plant control network 11) relating to the IOP(B), including the location information and the fact that IOP(B) is the backup to module 1 (i.e., the module having logical address 1). That information is transmitted to controller 30 during normal operations of the system 10 and the controller data base is updated (reference state 2 of Table 1, assume IOP(B) 21-B has been located in file 4, card slot 10). It will be recognized by those skilled in the art that many techniques are available for the manual inputting of such information from an operator input terminal and will not be discussed further herein since it is not necessary for understanding the redundancy scheme of the present system.

TABLE 1

| CONTROLLER 30 DATA BASE | | State 1 Initial, Non-Redundant | State 2 Initial Redundant | State 3 Normal Redundant |
|---|---|---|---|---|
| Logical Address | | 1 | 1 | 1 |
| Physical Address A | File (rack, row, . . . ) | 3 | 3 | 3 |
| | Card (slot within file) | 8 | 8 | 8 |
| Physical Address B | File | 0 | 4 | 4 |
| | Card | 0 | 10 | 10 |
| Redundant (Yes or No) | | N | Y | Y |
| Synchronized (Yes or No) | | N | N | Y |
| Primary (A or B) | | A | A | A |

The controller 30 then acts to synchronize the IOP(B) 21-B in accordance with the method of the present invention. Synchronizing is the process whereby the same data base is contained in both IOP(A) 21-A and IOP(B) 21-B. The information of the data base of IOP(A) is requested by the controller 30. IOP(B) 21-B eavesdrops on the transmissions of data from IOP(A) 21-A to the controller 30 and stores the information in its data base memory, thereby causing the data base of IOP(B) 21-B to be the same, whereupon IOP(B) is commanded to start executing. IOP(B) performs the same operations as IOP(A) and outputs the same information to the FTA 251 at essentially the same time (however, each IOP is operating using its own clock). It will be recognized that IOP(B) 21-B is a dedicated backup. The operation of FTA 251, however, permits only IOP(A) or IOP(B) to reach the field device 250, as described above. Once IOP(B) is synchronized, the controller data base is updated as shown in state 3 of Table 1.

Figure 7:
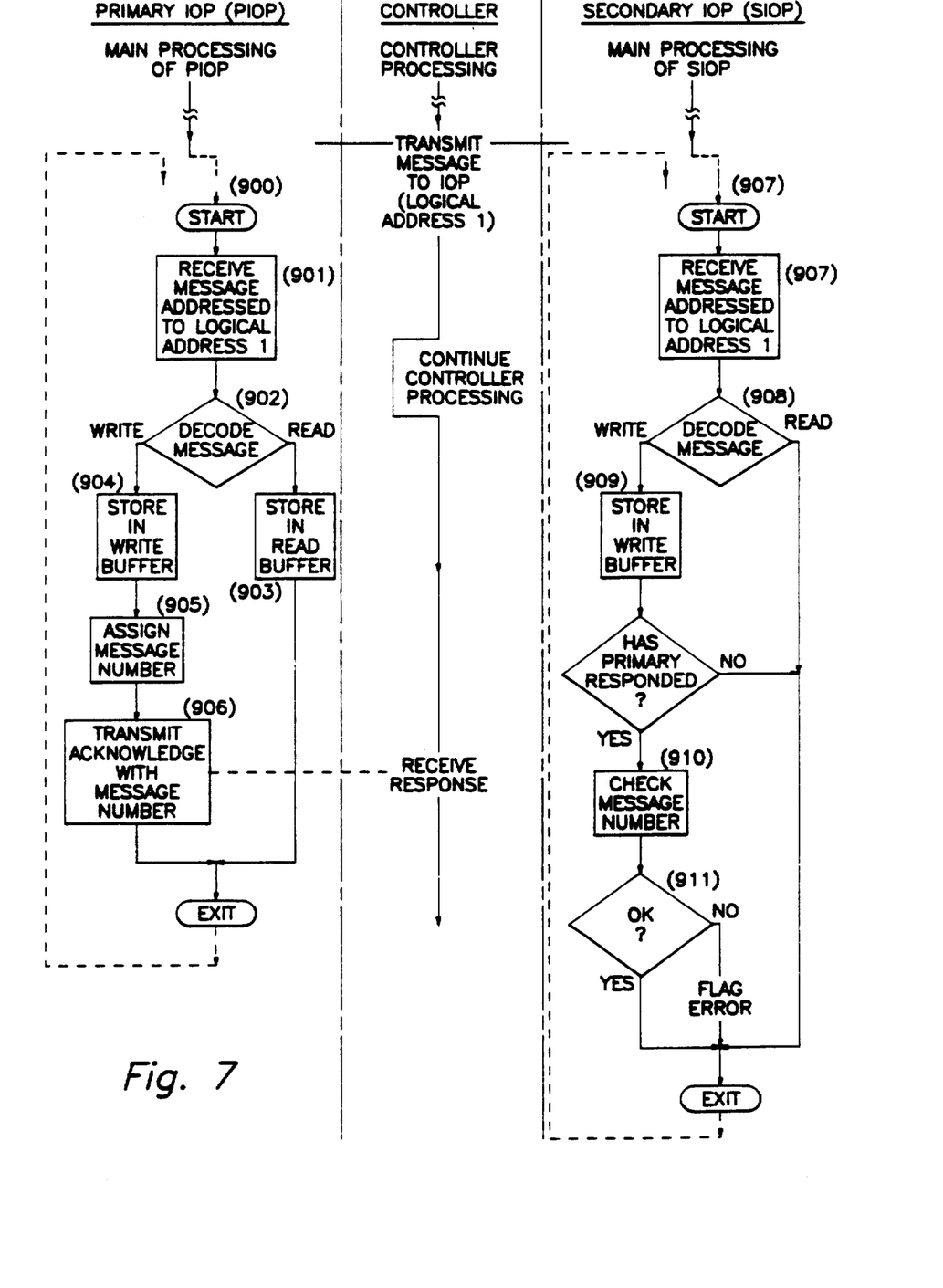
FIG. 7 shows a flow diagram of the communications scheme between the controller and the primary and secondary IOPs.

Referring to FIG. 7, there is shown a flow diagram of the communications scheme between the controller and the primary and secondary IOPs. In normal operation, all transfers (i.e., writes) to the IOP(A) 21-A from controller 30 are also received by IOP(B). IOP(B) eavesdrops on the communications since both IOP(A) and IOP(B) have a logical address of one in this example and the controller 30 communicates to the primary IOP by logical address. The controller is performing its main processing, the primary IOP is performing its main processing, and the secondary IOP is performing its main processing, which is the same as the primary IOP, but is running ahead or behind since each IOP is running off its own clock (this assumes initialization of the secondary IOP has been completed and is synchronized). At some point in time the controller transmits a message to IOP having a logical address of one. Both the primary IOP 21-A and the secondary IOP 21-B receive the message. The controller then continues with its main processing. However, the primary IOP breaks off from its main processing to accept the message received (block 900). The message addressed to logical address one is received (block 901) and the message is decoded (block 902). If a read message has been detected, the message is stored in a read buffer for subsequent reading of the requested data in the primary data base for subsequent transmittal to the controller (block 903). If a write message has been decoded the message is stored in a write buffer (block 904) and assigned a message number (block 905). An acknowledge message is then transmitted by the primary IOP (block 906) to the controller along with the message number assigned. The acknowledge message indicates to the controller that the message has been received and the message number indicates to the controller the message number assigned so that subsequent interrogations by the controller as to the status of the particular message request can be made by message number. (In this description write requests from the controller mean any changes to the data base.) Subsequent inquiries by the controller regarding the status of a message having a specific message number will result in a status return of in progress along with the message number. When the requested action is completed, which would normally take place during the main processing of the primary IOP, the status is updated to a complete status such that when a status request is made by the controller a complete status may be indicated. In the present embodiment, the completed status has three unique classes which include okay, warning, and failure. In this particular situation the failure means the action has not been taken because of some error (e.g., the point is not active, . . . ), and warning meaning that the action has taken place but the data has been modified (e.g. a request to open a valve 102% may be modified by the primary IOP to open the valve only 100%, . . . ).

The secondary IOP also receives the transmitted message having a logical address one, since the secondary IOP is aware of its primary partner's logical address. The secondary IOP breaks off from its main processing to accept the message (block 907). The received message is decoded (block 908) and if a read message has been detected the processing terminates and exits back to the main processing of the secondary IOP. If a write message has been detected, the message is stored in a write buffer (block 909) and after the primary has responded, the message number transmitted by the primary IOP to the controller in the acknowledge message is checked (block 910). If the primary fails to respond, the secondary ignores the message and exits. The message numbers are assigned sequentially so the secondary IOP has knowledge of the next message number to be allocated by the primary IOP (block 910). Also, during initial synchronization, the secondary IOP is made aware of the primary's current message number. If the message number checks out okay (block 911), the message processing routine of the secondary IOP exits and returns back to the main processing of the secondary IOP (block 911). If the message number is not the message number expected, an error is flagged for subsequently notifying the controller that an error, i.e. an incorrect message number, has been detected and that the secondary IOP is no longer in sync with the primary IOP. The secondary IOP in its main processing works on the same data as the primary IOP (assuming the message number check passed) but may occur at different times but in the same order. The secondary IOP, since it is running on its own clock, can be ahead or behind in its processing as compared to the main processing of the primary IOP.

Figure 8:
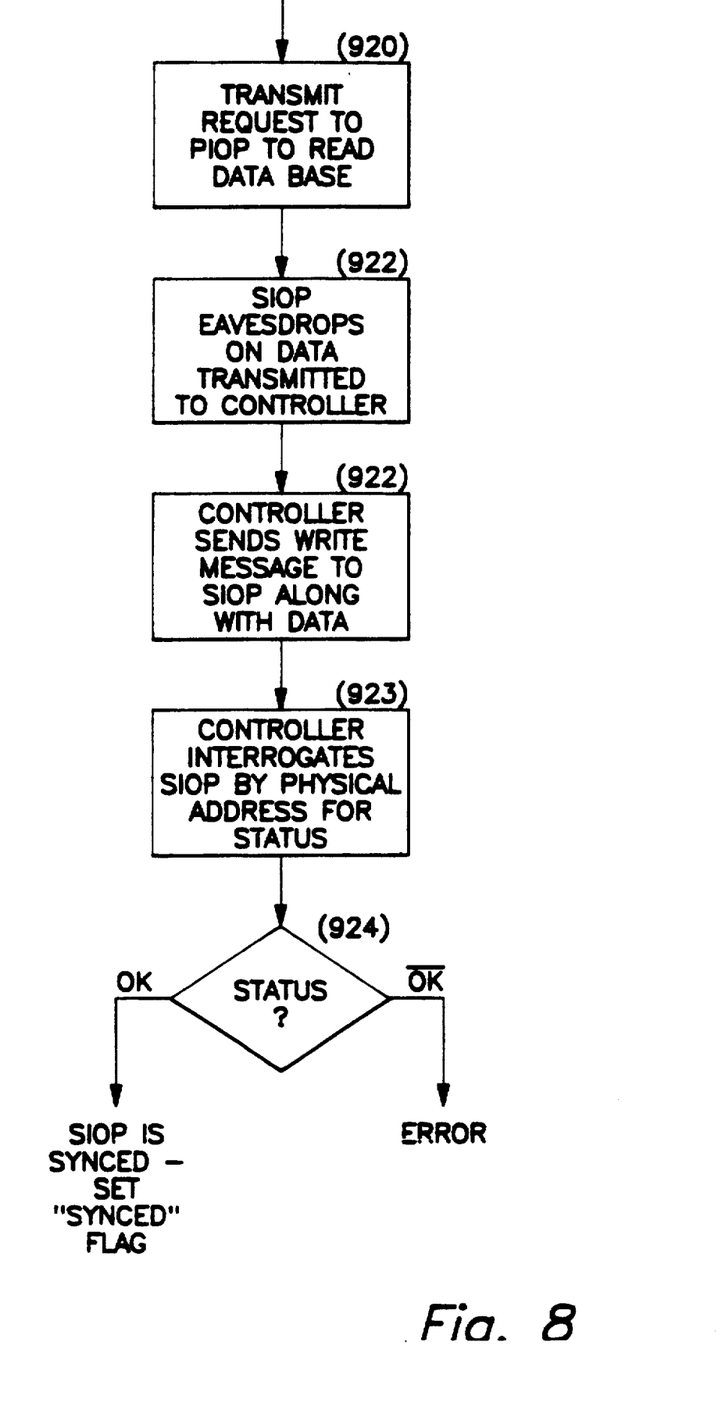
FIG. 8 shows a flow diagram of the initialization of the secondary IOP data base.

Referring to FIG. 8, a flow diagram of the initialization of the secondary IOP is shown. Consistent with the communications scheme described above in conjunction with FIG. 7, the controller transmits requests to the primary IOP to read the data base (block 920). The requested data is transmitted to the controller (block 921) by the primary IOP. The secondary IOP eavesdrops on the data base information being transmitted to the controller 30 and stores the information in its data base (block 922). In this manner the data base of the secondary IOP contains the same data as the primary IOP data base. The controller then interrogates the secondary IOP (by physical address) for status information (block 923). If the status checks out okay (block 924), the secondary IOP is synchronized and the controller sets the synchronized flag as consistent with the description above for Table 1. If the status indicates the transfer was not okay or that the data base update did not occur without any errors, an error is flagged and various error processing routines can take place, such as notifying the operator, set the status to non-synchronized, taking the secondary IOP offline, retry, . . . .

Figure 9:
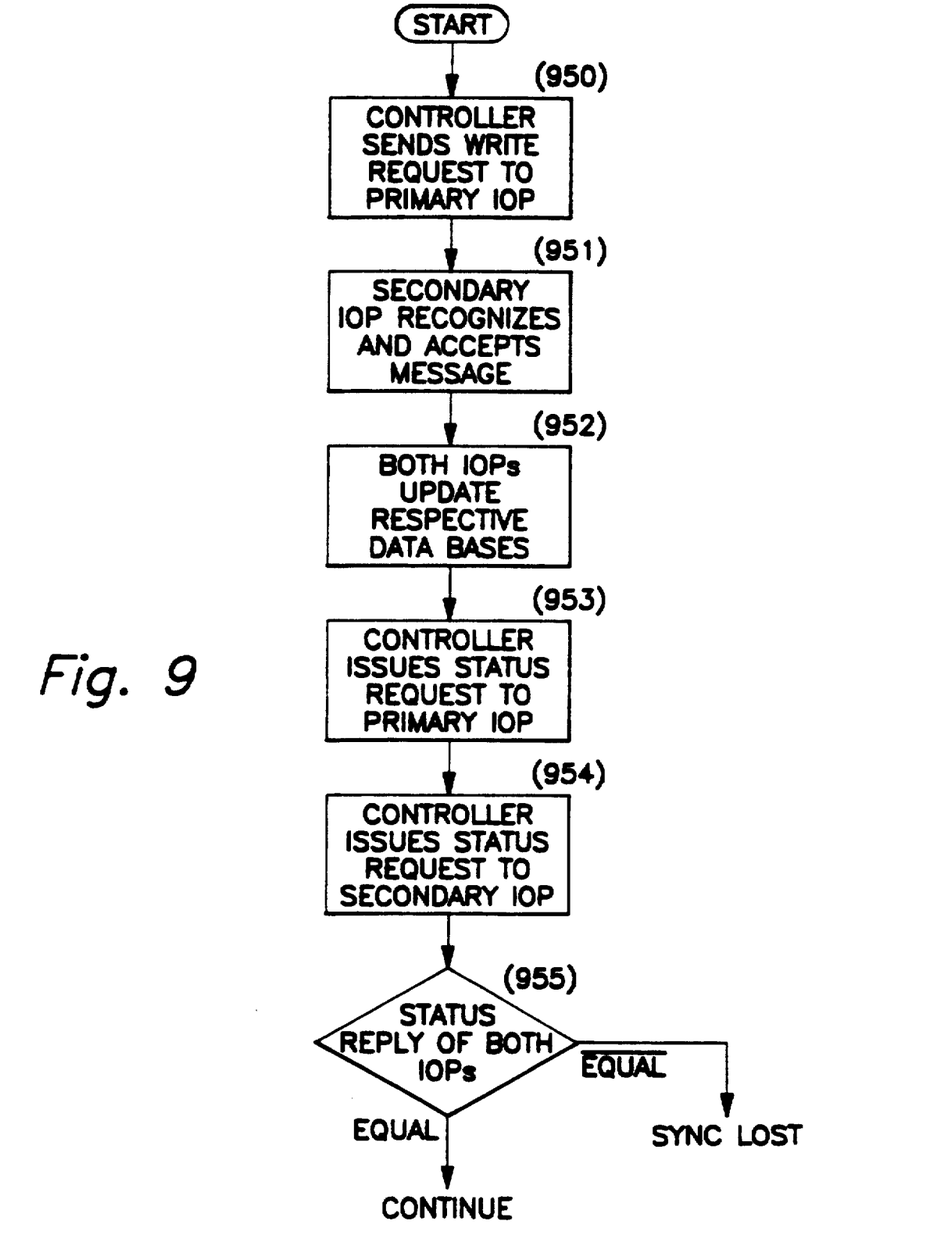
FIG. 9 shows a flow diagram of the guarantee store process of the preferred embodiment of the present invention.

Referring to FIG. 9, there is shown a flow diagram of the guarantee store process of the preferred embodiment of the present invention. The controller 30 communicates with the primary slave processor IOP(A) 21-A and the secondary slave processor IOP(B) 21-B via the communications link, BUS A 22, as described above, on which only the controller 30 can initiate communications. When the controller 30 desires to send information to the slave processors IOP(A) and IOP(B), the controller 30 sends a WRITE REQUEST to the primary IOP, IOP(A) utilizing the logical address as described above (block 950). The secondary IOP, IOP(B) eavesdrops on the communications and recognizes that its corresponding primary IOP has been addressed with a message, and the secondary IOP accepts the message also (block 951). In the preferred embodiment, the actual transmission of the message is only sent to the primary, as discussed above. Both the primary IOP and the secondary IOP will process the received message and verify the requested store in order to update their respective data bases (block 952). The controller 30 then issues a status request for the write request operation of the primary IOP (block 953), and also issues a status request for the write request operation of the secondary IOP (block 954). If the status reply from both IOPs is equal (block 955), the data bases of both IOPs are still in sync and the operation of the system continues. (Note that the primary and secondary IOP can error a write message and still maintain sync. However, the action that each must take must be identical (i.e., equal) in both the primary and secondary, and not necessarily without error, to maintain synchronization. If one detects an error they must both detect the same error. Thus, the status of both IOPs must be identical and not errorless.) If the status reply from both IOPs indicates some anomaly with the processing of the message, then the controller 30 indicates that synchronization is lost and proceeds to re-sync the IOPs. The verification via a positive reply to the status request permits the controller 30 to guarantee to any requestor that both the primary and secondary IOPs have their data bases updated in an identical manner.

Again, in normal operation, all transfers (i.e., writes) to the IOP(A) 21-A from controller 30 are also received by IOP(B). IOP(B) eavesdrops on communications since both IOP(A) and IOP(B) have a logical address of one in this example and the controller 30 communicates to the IOPs by logical address. In this manner, synchronization of IOP(B) is maintained, and no extra communications are necessary and no extra communication time is taken. In the present system, IOP(A) and IOP(B) do not initiate communications with controller 30, but respond to requests for information. In the secondary mode, the secondary IOP does not respond to write requests when the controller addresses the IOP by logical address, but does respond to the controller when the physical address is utilized. Periodically, the controller addresses both the primary and secondary IOPs to verify that no errors have occurred.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a process control system, having a master controller and at least one pair of slave input/output processors (IOPs) wherein a first IOP of the pair is a primary slave IOP and a second IOP of the pair is a secondary slave IOP, the first and second IOP having a first and second data base, respectively, the first and second IOP each executing the same tasks utilizing a first and second clocking system, respectively, and further wherein the data bases of the first and second IOPs are synchronized, communications by the master controller being made only to the first IOP including communications which modify the first data base, a method for insuring that the first and second data bases remain synchronized, comprising the steps of:
 a) communicating a write request type message from the master controller to the first IOP to update the first data base, the message being a write request type message which requests the first IOP to store data included in the write request type message into the first data base;
 b) eavesdropping on the communications of step (a) by the second IOP;
 c) when the second IOP recognizes that the message of step (a) is to the corresponding primary slave IOP, accepting receipt of the write request type message by the second IOP;
 d) executing the received write request type message by the first IOP and the second IOP, respectively, the execution of the received write request type message resulting in an update to the respective data bases with the data provided in said write request type message;
 e) issuing a status request type message by the master controller to the first IOP;
 f) issuing a status request type message by the master controller to the second IOP;
 g) responding to the status request type message from the master controller by the first IOP with a response indicating a current status of the first data base;
 h) responding to the status request type message from the master controller by the second IOP with a response indicating a current status of the second data base; and
 i) verifying that responses to the requests of steps (g) and (h) are equal, indicating the update of the respective first and second data bases was completed identically, to permit the master controller to be assured that the first and second data bases remain synchronized after the update of the respective data bases.

2. A method for insuring that the first and second data bases remain synchronized according to claim 1, wherein the step of executing in each IOP comprises the steps of:
 a) detecting the write request type message;
 b) updating the data base as specified by the message with the data provided within the write request type message; and
 c) determining the current status of the update for subsequent transmission to the master controller upon request.

3. A method of insuring that the first and second data bases remain synchronized according to claim 2, wherein the step of accepting receipt of the write request type message for each IOP comprises the steps of:
 a) detecting that a destination of the write request type message is for a logical address assigned to the first and second IOP; and
 b) storing the write request type message in a write buffer of the IOP for subsequent processing.

4. A method for insuring that the first and second data bases remain synchronized according to claim 3, wherein the step of issuing a status request type message by the master controller to the first IOP is by logical address.

5. A method for insuring that the first and second data bases remain synchronized according to claim 4, wherein the step of issuing a status request type message by the master controller to the second IOP is by physical address.

* * * * *